United States Patent [19]
Ito et al.

[11] 3,757,767
[45] Sept. 11, 1973

[54] ROOM HEATING APPARATUS

[75] Inventors: Toshio Ito; Tamotsu Nomaguchi; Tatsuo Saito, all of Amagasaki, Japan

[73] Assignee: Mitsubishi Denki Kabushiki Kaisha, Tokyo, Japan

[22] Filed: Oct. 8, 1971

[21] Appl. No.: 187,638

[30] Foreign Application Priority Data
Oct. 8, 1970  Japan.............................. 45/100408
Apr. 24, 1971  Japan.............................. 46/17102

[52] U.S. Cl. .............................. 126/110 B, 239/566
[51] Int. Cl. .............................................. F24h 3/08
[58] Field of Search .................... 126/110 R, 110 B, 126/116 R, 90 R; 239/568, 566, 552

[56] References Cited
UNITED STATES PATENTS
2,129,059   9/1938   Herbster et al. ................ 126/110 B
2,588,895   3/1952   Tavener............................ 239/552
2,818,059   12/1957  Cayot............................... 126/110 R

FOREIGN PATENTS OR APPLICATIONS
257,202   8/1926   Great Britain.................... 126/90 R
892,130   3/1944   France............................... 239/566

*Primary Examiner*—William F. O'Dea
*Assistant Examiner*—Harold Joyce
*Attorney*—Oblon, Fisher & Spivak

[57] ABSTRACT

A room heating apparatus using combustion gas having a linear type burner in the bottom or at one side thereof and a first heat exchanger substantially flat in configuration wherein a combustion gas is generated in an inner space of the first heat exchanger so that heat is transmitted to the outer part thereof. A second heat exchanger also being substantially flat in shape has an inner space which is connected to the inner space of the first heat exchanger so that the combustion gas being generated in the inner space of the first heat exchanger is passed to the inner space of the second heat exchanger and the heat thereof is transmitted to the outer surface thereof by a forcible convection current. Thus, the room heating apparatus is a compact heating apparatus having high thermal efficiency and the combustion occurs in a combustion chamber having high sealing efficiency to provide high efficiency of heating by heat radiation and forcible convection current.

12 Claims, 12 Drawing Figures

PATENTED SEP 11 1973 3,757,767

INVENTORS
TOSHIO ITO
TAMOTSU NOMAGUCHI
TATSUO SAITO

BY Oblon, Fisher & Spivak
ATTORNEYS (a)

ROOM HEATING APPARATUS

BACKGROUND OF THE INVENTION

1. Field of the Invention

This invention relates to a room heating apparatus of compact structure from which combustion gas is exhausted to the outdoors.

2. Description of the Prior Art

In conventional heating systems used for room heating wherein the combustion occurs in a combustion chamber having high sealing efficiency and the room is heated by radiation of heat from the outer surface of the wall of the combustion chamber, and the combustion gas is exhausted by suitable means to the outdoors, contamination of the air in the room caused by the combustion gas is advantageously prevented. However, there is a need to increase the thermal efficiency of such heating systems. One accepted method of increasing the thermal efficiency of former heating systems is to combine both heat transmissions by heat radiation and by forcible convection. Although various systems have been proposed and practiced which utilize this combination for overcoming the disadvantage of low thermal efficiency of such conventional heating apparatus, and have been generally successful, they have not been entirely satisfactory and improvements are continuously being sought.

SUMMARY OF THE INVENTION

It is an object of this invention, therefore, to provide an improved apparatus for heating a room with warm air resulting mainly from heat radiation from the wall of a combustion chamber heated by a combustion gas in a high temperature zone, and by transmitting heat energy from a heat exchanger by forcible convection current at a place where the combustion gas is at a lower temperature and radiation heat transmission is not high.

It is another object of this invention to provide a compact room heating apparatus wherein both first and second heat exchangers of substantially flat configuration are used for heating by heat radiation and warm air is provided by convection current in balanced heating.

Still another object of this invention is to prevent locally raising the temperature of a heat exchanger by using a linear type burner so as to provide uniform distribution of temperature along a horizontal direction.

Still a further object of this invention is to provide a room heating apparatus which exhausts the combustion gas to outdoors and provides high thermal efficiency on the order of 90 percent for the combustion gas, which is unpredictable in comparison with conventional room heating apparatus exhausting combustion gas to outdoors, whose thermal efficiency is about 70 percent.

A still further object of this invention is to provide a room heating apparatus providing high thermal efficiency without providing any special fins on the heat exchanger.

Yet another object of this invention is to provide a room heating apparatus providing remarkably high heat exchange wherein air for a forcible convection current is passed through a passage between a guide and a back plate of a second heat exchanger receiving combustion gas from a first heat exchanger wherein combustion occurs, and is further passed through passages between a back plate and a front plate of the second heat exchanger to transmit heat energy from the second heat exchanger.

Yet still another object of this invention is to provide a room heating apparatus wherein heat is mainly transmitted from the front plates of first and second connected heat exchangers having substantially flat shapes.

Another object of this invention is to provide a linear type of burner providing stabilized combustion which is suitable to apply to a compact room heating apparatus.

The foregoing and other objects are attained by an improved room heating apparatus which, according to this invention, provides a linear type burner disposed in the bottom or at one side of a first heat exchanger of substantially flat configuration in which combustion gas is formed in an inner space thereof for transmitting heat energy to an outer part, a second heat exchanger also being substantially flat-shaped and having an inner space connected to the inner space of the first heat exchanger to pass the combustion gas to the inner space of the second heat exchanger for transmitting heat energy to an outer part of the second heat exchanger by forcible convection current, a duct for exhausting the combustion gas from the inner space of the second heat exchanger, passages provided between back plate and front plates of the second heat exchanger for preventing leakage of the combustion gas from the inner space of the second heat exchanger to the outer part, and a guide covering the back plate of the second heat exchanger to form a passage for blowing air to provide forcible convection current between the guide and the back plate. If desirable, a guide for covering the back plate of the first heat exchanger may be provided to form a passage to supply air for combustion between the guide and the back plate thereof. Both the back plates of the first heat exchanger and the second heat exchanger can be press-molded in one piece, and both of the front plates thereof can also be press-molded in one piece. The linear type burner can be provided with a flame projector plate having comb-shaped teeth with a plurality of parallel slits of uniform width or a plurality of slits being parallel in the bottom part and V-shaped at the upper part.

BRIEF DESCRIPTION OF THE DRAWINGS

Various other objects, features and attendant advantages of the present invention will be more fully appreciated as the same becomes better understood from the following detailed description when considered in connection with the accompanying Drawings, wherein.

DESCRIPTION OF THE PREFERRED EMBODIMENTS

Figure 1:
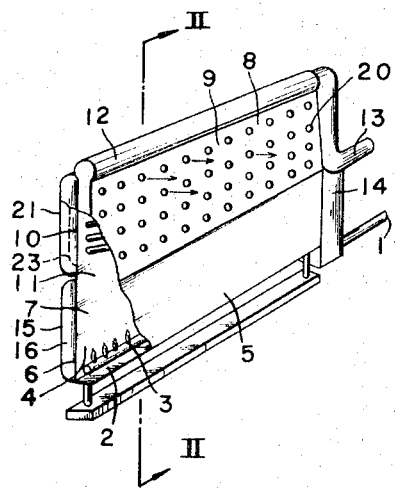
FIG. 1 is a schematic view of an embodiment of a room heating apparatus embodying the principles of the present invention.
Figure 2:
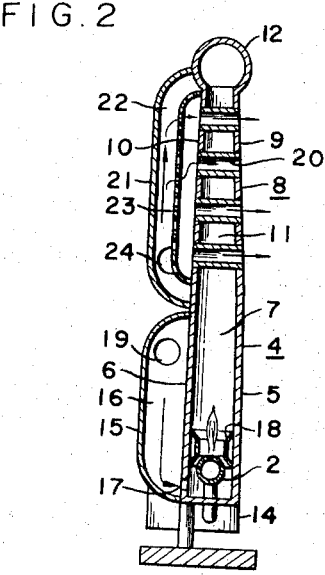
FIG. 2 is a cross-sectional view taken along the line II—II of FIG. 1.

Referring now to the Drawings, wherein like reference numerals designate like or corresponding parts throughout the several figures, and more particularly to FIGS. 1 and 2 thereof, one embodiment of the heating apparatus of this invention is illustrated wherein the reference numeral 1 indicates a fuel gas inlet pipe through which a fuel gas preliminarily mixed with air by an ejector effect of fuel gas injection just in front of the connection with a linear type burner 2 is supplied to the linear type burner 2, which is provided with a plurality of flame holes arranged in a line therealong in normal fashion.

A first heat exchanger 4 having a substantially flat shape is provided with a front plate 5 and a back plate 6 which form an inner chamber 7, in the bottom of which the linear burner 2 is disposed in such a manner that the inner chamber 7 forms a combustion chamber for the burner 2. A second heat exchanger 8 also having a substantially flat shape is provided with a front plate 9 connected to the front plate 5 of the first heat exchanger 4 as an integral vertical wall and a back plate 10 connected to the back plate 6 of the first heat exchanger as an integral generally vertical wall. An inner chamber 11 of the second heat exchanger 8 is connected to the inner chamber 7 of the first heat exchanger 4. A duct 12 is connected with the inner chamber 11 of the second heat exchanger 8, being placed at the top of the second heat exchanger for collecting combustion gas therefrom. The reference numeral 13 indicates an outlet pipe for the combustion gas which is connected to one end of the duct 12. Thus, the combustion gas generated from the linear type burner 2 is exhausted through the inner space 7 of the first heat exchanger 4, the inner space 11 of the second heat exchanger 8, and the duct 12 to the outlet pipe 13, but is not leaked otherwise to the outer surrounding atmosphere because the heating apparatus has substantial sealing provided at all connecting points.

The reference number 14 indicates a blower and 15 indicates a guide plate covering the back plate 6 of the first heat exchanger 4 so as to form a passage 16 between the guide plate 15 and the back plate 6 for providing additional secondary air through a plurality of holes 17 in the lower part of the back plate 6 of the first heat exchanger 4, the holes 17 being distributed in parallel relation to the linear type burner 2 below the flame holes 3 thereof. A guide plate 18 is provided in the lower part of chamber 7 for transferring air supplied through the plurality of holes 17 to the region of the flame holes 3 of the linear type burner 2. The air supplied from the holes 17 is secondary air for mixing with the fuel gas being driven by the blower 14 from a supply pipe 19 to the passage 16.

A plurality of passages 20 are provided between the back plate 10 and the front plate 9 of the second heat exchanger 8 being formed so that the combustion gas in the inner space 11 of the second heat exchanger 8 is not leaked to the outside. A guide plate 21 is provided for covering the back plate 10 of the second heat exchanger 8, and a passage 22 of air for forcible convection current is formed between the guide plate 21 and the back plate 10. The reference number 23 indicates a uniform pressure plate having a plurality of fine holes which covers all of the passages on the back plate 10. The uniform pressure plate 23 is used for uniform distribution of the air for forcible convection to all of the passages 20. The air for the forcible convection current is supplied by the blower 14 through a pipe 24 and is passed through the passage 22 and the holes of uniform pressure plate 23 to the passages 20, from which it is blown into the room.

The front plates 5 and 9 and the back plates 6 and 10, respectively, of the first and the second heat exchangers 4 and 8 are made of suitable metal, such as iron plate, treated with heat resistant material. Also, in the drawing, the arrow head symbols indicate the direction of air currents.

Figure 3:
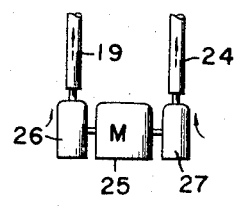
FIG. 3 is a schematic view of a blower used for the apparatus of FIG. 1.

FIG. 3 shows a schematic view of a blower 14 wherein a motor 25 is provided with fans 26 and 27 mounted on respective shafts thereof which are connected with the pipes 19 and 24, respectively.

The operation of the room heating apparatus constructed according to this invention as described hereinabove is as follows:

Fuel gas is supplied through fuel inlet pipe 1 to the flame holes 3 of the linear type burner 2 and into the inner space 7 of the first heat exchanger 4, wherein it is mixed with air supplied from the blower 14 through the passage 16 and is ignited to initiate combustion. Heat energy from the combustion gas is transmitted to the front plate 5 and the back plate 6 of the first heat exchanger 4 by radiation and convection current. The heat transmitted to the back plate 6 is used for heating the air being provided for combustion which passes on the back surface of the back plate through the passage 16. The heat energy transmitted to the front plate 5 raises the temperature of the front plate to heat the room by radiation and natural convection. The combustion gas is passed further to the second heat exchanger in which heat energy is transmitted through the walls of the passages 20 and of the back plate 10 to air being supplied by the blower 14 through the passage 22 and the uniform pressure plate 23 to the passages 20. The combustion gas in the second heat exchanger is collected in the duct 12 thereabove from which it is exhausted through the outlet pipe 13 to the outdoors.

In this embodiment, the combined combustion space of inner spaces 7 and 11 of the first and the second heat exchangers 4 and 8, respectively, has a long width and a small thickness to be substantially flat in shape, so that the heat transmission from the combustion gas to the front plates 5 and 9 and the back plates 6 and 10 of the first and second heat exchangers is remarkably higher than those of combustion chambers having a round or square shape. Accordingly, it remarkably increases the heating effect produced by heat radiation from the front plate 5 of the first heat exchanger which the combustion gas having a high temperature contacts.

Where the temperature of the combustion gas in the inner space 7 of the first heat exchanger 4 was 2000°K., the temperature of the combustion gas in the inner space 11 of the second heat exchanger was about 1,000°K., and accordingly, about 50 percent of the heat energy input was used for heating the room. In order to increase the heating efficiency more than 50 percent, it is necessary to increase the area of the radiation plate in accordance with the equation of Stephen & Boltzmann, whereby the size of the heating apparatus should be quite large. Accordingly, it is far more effective to exchange heat by convection after the temperature of the combustion gas has reached about 1,000°K. In accordance with this invention, heat energy is mainly exchanged by forcible convection in the second heat exchanger.

In this invention, the shapes of the first heat exchanger 4 and the second heat exchanger 8 are, respectively, substantially flat, which means that the width and the height as well are more than ten times the thickness. The terms of width and thickness mean the length of each of the two dimensions of a perpendicular sectional view of the combustion gas flow in the inner spaces of the heat exchangers. The thermal efficiency of the heating apparatus according to this invention can be increased to about 90 percent, where the width and the height of the inner space are, respectively, about 10 times the thickness of the inner space of each of the first and the second heat exchangers 4 and 8. Such high thermal efficiency is unpredictable in comparison with conventional room heating apparatus for exhausting combustion gas to the outdoors, the thermal efficiency of which is only about 70 percent.

Also, the thermal efficiency of the heating apparatus according to this invention can be increased to about 95 percent, where the width and the height of the inner space are, respectively, more than 10 times the thickness of the inner space. Where the width of the combustion space is more than 10 times the thickness, a compact room heating apparatus having the best balance of heating by radiation heating and convection heating is provided. Moreover, the guide plate 15 covering the back plate 6 of the first heat exchanger 4 is provided so as to pass air for combustion through the passage 16, whereby the air for combustion is preheated by the heat transmitted to the back plate 6, and the heat energy is thereby effectively utilized, so that a large amount of heat energy is provided from the front of the apparatus to the room.

Figure 4:
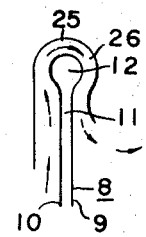
FIG. 4 is a schematic view of a heat exchanger for providing forcible convection current that is used for the apparatus of this invention.

FIG. 4 shows another embodiment of the second heat exchanger 8 for providing forcible convection, which can be employed where it is difficult to provide a plurality of passages 20 therein. In this case, a guide plate 25 is provided to cover the back plate 10 of the second heat exchanger 8 and the duct 12, so that the air for forcible convection is passed through a passage 26 formed between the guide plate and the back plate and the duct.

Figure 5:
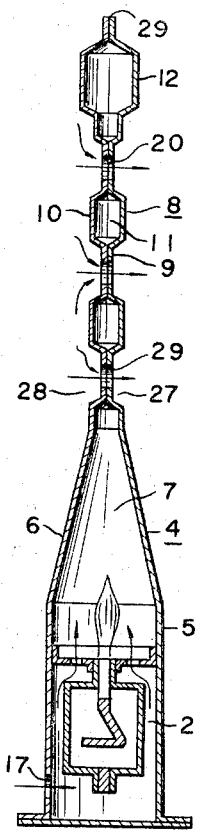
FIG. 5 is a sectional view of the first and second heat exchangers forming the heating system according to this invention; and, FIG. 6(a) is a sectional front view of a linear type burner employed in the apparatus constructed according to this invention.

Another embodiment of the heating apparatus is illustrated in FIG. 5, in which the first and second heat exchangers are easily constructed. In order to obtain a compact heat exchanger having high thermal efficiency, it is preferable to provide fins for receiving heat and other fins for radiating heat. However, it is hard to construct or manufacture a heat exchanger having many fins when using stainless steel or iron. The first and second heat exchangers shown in FIG. 5 are prepared without fins. The back plate 6 of the first heat exchanger 4, the back plate 10 of the second heat exchanger 8, and a half of the duct 12 are formed in one piece by pressing to provide a plate 28 having the shape shown. Also, the front plate 5 of the first heat exchanger 4, the front plate 9 of the second heat exchanger 8 and the other half of the duct 12 are press-formed in one piece to provide a plate 27 of an inverse shape to that of plate 28 so that when both of the pressed plates 27 and 28 are assembled, they form the plurality of passages 20, and the plurality of contacts 29 of both of the plates are then welded by electric resistance. If preferable, they can be welded by other methods, such as solder welding.

Figure 6:
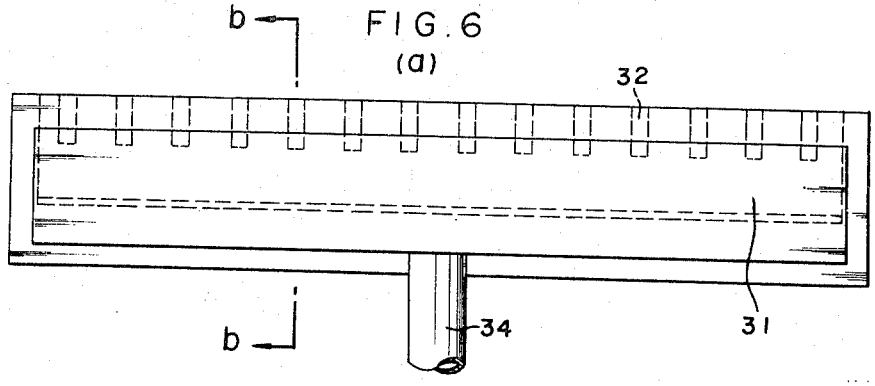
FIG. 6(b) is a sectional side view of FIG. 6(a)
FIG. 6(c) is a schematic view of the linear type burner of FIG. 6(a)
FIG. 6(d) is a front view of the flame hole plate of the burner.
FIG. 6(e) is a side view of the flame hole plate of FIG. 6(d)
FIG. 6(f) is a front view of another type of flame hole plate.
FIG. 6(g) is a side view of the flame hole plate of FIG. 6(f).

FIG. 6 shows one embodiment of a linear type burner of the type necessary to provide a compact heating apparatus. One feature that the burner must possess is that it must prevent so-called "lifting," wherein the bottom of the flame is separated from the flame holes of the burner, and "back firing," wherein the fire is set into the flame holes of the burner. It is well known that "lifting" or "back firing" may occur depending upon the depth of the flame holes.

The possibility of "lifting" or "back firing" occurring also depends upon the velocity of the mixture of fuel gas and air at the flame holes, when a type of fuel gas and an amount of primary air for mixing therewith are the same. Since the "lifting" is in the opposite relation to "back firing" on the velocity of the mixture of fuel gas and air, back-firing tends to occur by preventing lifting while lifting tends to occur by preventing back-firing. Accordingly, it is necessary to carefully assemble the structure of the burner.

Figure 6B:
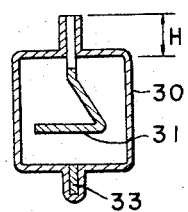
Figure 6C:
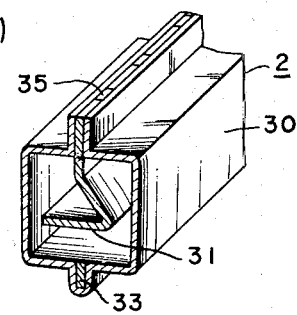
Figure 6D:
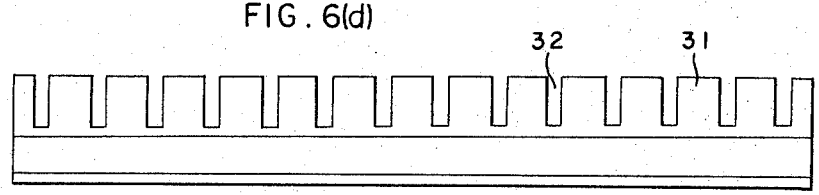

FIG. 6 shows a burner used for this invention, wherein FIG. 6(a) is the front view, FIG. 6(b) is the cross-sectional view taken along the line b—b of FIG. 6(a), and FIG. 6(c) is a schematic view. In the drawing, the reference numeral 30 indicates an outer wall of the linear type burner 2 which is prepared by pressing a metal plate to form a rectangular convex. The reference numeral 31 indicates a plate having a plurality of rectangular slits 32 formed therein having equal gaps therebetween to form a tooth-shaped comb, and the lower part of the plate is bent to form a horizontal part. The detail of the flame hole plate 31 is shown in the front view of FIG. 6(d) and the side view of FIG. 6(e). As shown in FIG. 6(c), the flame hole plate 31 is held between two facing plates of the outer wall 30 at the upper edges thereof and is connected by spot welding, and a spacer 33 is set between two depending portions of the outer wall 30, and the parts are then welded to form the burner 2.

The reference numeral 34 indicates an inlet pipe for supplying fuel to the burner. The slits 32 of the flame hole plate 31 extend into the convex of the outer walls 30 whereby holes 35 having rectangular shape and being formed by the slits 32 and the facing plates of the outer walls 30 are used as the flame holes. Accordingly, the depth of the flame holes can be easily selected so that the likelihood of lifting and back-firing can be decreased. Preferably, the outer walls 30 and the flame hole plate 31 of the burner are made of stainless steel or the like.

Figure 6F:
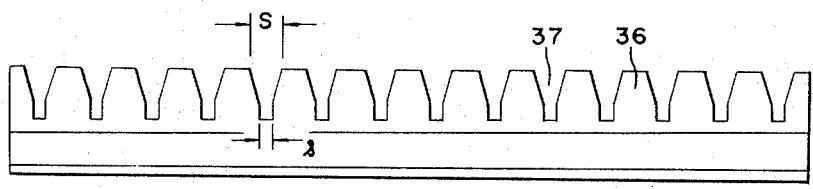
Figure 6E:
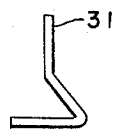
Figure 6G:
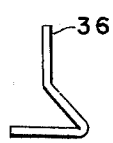

Another embodiment of a flame hole plate being designated by the numeral 36 is shown in FIG. 6(f) as a front view and in FIG. 6(g) as a side view, wherein the bottoms of the slits 37 are horizontally disposed relative to the length and the upper parts thereof are V-shaped. Where the flame hole plate 36 is used, backfiring can be prevented since the velocity of the gas is fast at the bottom of the slit, while lifting can be prevented since the velocity of the gas is slower at the upper edges of the holes, whereby combustion occurs in the best condition.

According to experiments, it has been found that the best result can be obtained when the depth (H) of the flame holes 37 supplying city gas, natural gas and propane gas in a normal condition is in a range of 3–15 mm., and the width of the slit is s at the bottom and S at the top edges, where S is more than 2s.

It is understood that the shape of the slits in the flame hole plates is not limited to that of the slits 32 and 37 of the flame hole plates 31 and 36, but may have other forms.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A room heating apparatus using combustion gas comprising:
    a first heat exchanger for transmitting heat energy therefrom to said room by heat radiation having a substantially flat shape and providing an open inner space;
    a linear type burner disposed in said inner space of said first heat exchanger for generating combustion gas therein;
    a second heat exchanger for transmitting heat energy therefrom by forcible convection current having a substantially flat shape and providing another inner space being connected to the inner space of said first heat exchanger for receiving combustion gas therefrom;
    an outlet pipe for exhausting combustion gas from the inner space of said second heat exchanger;
    a plurality of passageways through said second heat exchanger for permitting forcible convection of air therethrough and for preventing leakage of the combustion gas to the outside from said inner space of said second heat exchanger; and,
    a guide plate covering one surface of said second heat exchanger for forming a passage for providing air to said passageways.

2. A room heating apparatus according to claim 1, further comprising a second guide plate for covering one surface of said first heat exchanger for forming a passage for providing air for combustion between said second guide plate and said one surface of said first heat exchanger to said linear type burner.

3. A room heating apparatus according to claim 1, wherein the width of said first heat exchanger is more than 10 times the thickness thereof.

4. A room heating apparatus according to claim 1, wherein the width of said second heat exchanger is more than 10 times the thickness thereof.

5. A room heating apparatus according to claim 1, wherein the front surfaces of said first heat exchanger and said second heat exchanger are press-formed from a single sheet of material.

6. A room heating apparatus according to claim 1, wherein said one surface of said second heat exchanger is the back surface thereof and the back surfaces of said first heat exchanger and said second heat exchanger are press-shaped from a single sheet of material.

7. A room heating apparatus according to claim 1, wherein said linear type burner comprises a comb teeth-shaped flame hole plate having a plurality of parallel slits of uniform width being disposed between front and back walls of a fuel gas charging device, whereby said slits form spaced openings in the top of said device which are used as flame holes.

8. A room heating apparatus according to claim 1, wherein said linear type burner comprises a comb teeth-shaped flame hole plate having a plurality of uniformly spaced slits which are respectively parallel at the deepest regions thereof and are V-shaped adjacent their openings, being disposed between front and back outer walls of a fuel gas charging device, whereby said slits form spaced openings in the top of said device which are used as flame holes.

9. A room heating apparatus using combustion gas comprising:
    a first heat exchanger for transmitting heat energy therefrom to said room by heat radiation having a front wall and a back wall providing an inner space therebetween and being substantially flat in shape;
    a linear type burner disposed in the lower part of said inner space of said first heat exchanger for generating combustion gas therein;
    a second heat exchanger for transmitting heat energy by forcible convection current having a front wall and a back wall providing an inner space and being substantially flat in shape, said inner space of said second heat exchanger being connected with said inner space of said first heat exchanger for receiving combustion gas therefrom;
    an outlet pipe for exhausting combustion gas from the inner space of said second heat exchanger; and,
    a guide plate covering the back wall and the front wall of said second heat exchanger to form a passageway for air to provide forcible convection.

10. The room heating apparatus according to claim 9, further comprising a blower for providing air flow for forcible convection being passed from a rear portion of said passageway to a front portion of said passageway, said portions being formed between said guide plate and said back wall, and said guide plate and said front wall, respectively.

11. A room heating apparatus according to claim 9, wherein the width of said first heat exchanger is more than 10 times the thickness thereof.

12. A room heating apparatus according to claim 9, wherein the width of said second heat exchanger is more than 10 times the thickness thereof.

* * * * *